INVENTOR.
ANDREW G.F. DINGWALL
BY
Roland A. Anderson
Attorney

INVENTOR.
ANDREW G.F. DINGWALL
BY
Attorney

INVENTOR.
ANDREW G.F. DINGWALL
BY
[signature]
Attorney

United States Patent Office 3,449,172
Patented June 10, 1969

3,449,172

THERMOELECTRIC ASSEMBLY HAVING A PRE-PUNCHED METAL FOIL CONNECTOR

Andrew G. F. Dingwall, Somerville, N.J., assignor, by mesne assignments, to the United States of America as represented by the United States Atomic Energy Commission

Filed June 9, 1967, Ser. No. 645,581
Int. Cl. G21h *1/10*
U.S. Cl. 136—202 1 Claim

ABSTRACT OF THE DISCLOSURE

A flexible, high thermal conductance connector for elements of a high temperature, radioisotope heated thermoelectric generator having folded metallic foil between the individual thermoelements and a heat sink therefor in a low volume, compact, multi-thermoelement assembly that is efficiently produced and that provides a unique spring action, reliable all metallurgical connections and high thermal transfer between the thermoelements and the heat sink.

This invention was made in the course of or under a contract with the United States Atomic Energy Commission.

BACKGROUND OF THE INVENTION

In the field of thermoelectric generators, it is desirable to provide a flexible connector to compensate for severe heat stresses due to the differential thermal expansion between the generator elements, up to 0.025 inch or more, at a force level of up to 50 lb./thermoelement. Various proposals have been made and used to provide the desired flexible connections, comprising those arrangements shown and described in U.S. Patent 3,221,508, issued Dec. 7, 1965, by J. B. Roes et al., and assigned to the U.S. Government, U.S. Patent 3,234,048, issued Feb. 8, 1966 by R. K. Nelson, and U.S. Patent 3,208,877, issued Sept. 28, 1965 by J. D. Merry. While these arrangements are useful and can accomplish flexibility they do require the manufacture and assembly of materials, such as rubber or polytetrafluoroethylene, in which the temperatures of operation are limited to low levels typical of non-metallic or organic materials. Furthermore, these systems have had low thermal conductance, e.g. below about 1 watt/cm.$^2$—° C. It has additionally been desirable to provide an easily fabricated, reliable, and strong connector for several members at one time in a low volume, compact, multi-thermoelement assembly having a radioisotope heat source for use in the environment of space.

It is an object of this invention, therefore, to provide an economical, strong, reliable, long operating lifetime, and practical apparatus and method for flexibly connecting a plurality of rigid, relatively hot and cold metal, heat exchange members in a thermoelectric generator system by providing an all-metallurgical, folded metal heat flux path having compliant fingers for absorbing thermal stresses due to differences in thermal expansion between the members, and for efficiently transferring heat between said members.

It is a further object to provide means and method for physically bonding a flexible all-metallurgical connector between thermoelements and a heat sink.

It is a further object to provide means for varying the flexible connector configuration between a plurality of thermoelements and a heat sink.

It is a further object to provide high temperature compliant means that will cause the least interference with the heat flux and the most absorption of the thermal stresses between a plurality of high temperature thermoelements and a heat sink therefor.

SUMMARY OF THE INVENTION

This invention provides a flexible connector for thermoelectric devices formed by pre-punched metal foil compactly connected between a plurality of thermoelements and a heat sink. In one embodiment, the connector of this invention provides a waffle shaped connector having three-dimensional compliance that reduces or substantially eliminates damage from thermal stresses due to differential thermal expansion between the thermoelements and the heat sink over a broad range of temperatures. With the proper selection of components and procedures, as described in more detail hereinafter, the connector of this invention provides for an all-metallurgical flux path for conductive heat transfer between rigid hot and cold metal heat exchangers through which heat transfer liquids are pumped from a radioactive heat source at 1500° F. or more. In another aspect, this invention provides chevron-shaped foil fingers having a slight upward spring pressure that contacts each finger against an upper bonding surface, and capillary action that tends to coalesce braze in point contact with the fingers.

The above and other novel features and objects of this invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings where like parts are referenced alike.

DESCRIPTION OF THE PREFERRED EMBODIMENTS

Figure 1:
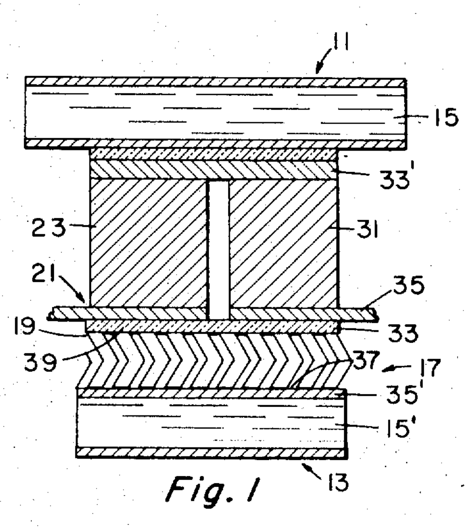
FIGURE 1 is a partial cross-section of a thermoelectric generator system incorporating the flexible connector of this invention.

This invention provides a compact means of obtaining efficient thermal contacts between a thermoelement and a heat sink and at the same time providing high three-dimensional compliance so that the thermal stresses therebetween cannot be transmitted to the thermoelement. Such stresses tend to arise when thermoelements are assembled in compact configurations between rigid hot and cold metal heat exchangers 11 and 13, such as are shown in FIGURE 1, wherein a pumped heat transfer liquid 15, for example, liquid sodium, circulates to transfer the heat output from a radioisotope heat source, not shown. Because the hot and cold heat sinks 11 and 13 undergo differing thermal expansions when they change from room temperature to high operating temperatures, e.g. up to 1500° F. or more, and since there are large temperature differentials therebetween, e.g. up to 500° F. or more, high shear stresses tend to accumulate in the thermoelements due to lateral displacements and/or possibly warpage, if the thermoelements directly connect between the hot and cold plates. Should the waffle shaped flexible connector 17 of this invention be inserted with its fingers 19 connected between the cold end 21 of a thermoelement 23 and the corresponding heat sink 13, however, the connector 17 provides an efficient, all-metallurgical, flexible, flux path for conductive heat transfer from the hot sink 11 to the cold sink 13, wherein fluid 15' circulates Referring now to FIG. 2, a prepunched folded metal foil 25, normally 2–5 mil OFHC copper, provides controlled three dimensional flexibility in connector 17. To this end the rectangular shaped laminates 27 formed by folding pre-punched foil provide maximum flexibility in the $x$ axis direction due to cantilever action of the laminates 27, while the slots 29 aid flexibility along the $y$-axis, which is mutually perpendicular to the $x$ and $z$ axes, through a combination of torsion and buckling modes, according to the number of slots and their spacing. Advantageously, during brazing at the cold ends 21 of the thermoelements, such as elements 23 and 31, the individual fingers 19 compress a predetermined amount to a chevron-like configuration, as shown in FIG. 1, to achieve excellent $z$-axis compliance about the bent state.

Compressively deflecting the flexible, waffle shaped laminates 27 between the electrical insulator 33, which connects to electrically conducting strap 35 for the thermoelements 23 and 31, and the wall 35' of cold sink 13, produces the chevron configuration. Brazing during this operation in a suitable vice or brazing jig, causes the individual fingers 19 to provide slight upward spring pressure from each of the fingers 19 that results in sufficient contact at the inner bonding surfaces 37 to permit rapid, economic, simple and reliable brazing. Moreover, this further enhances brazeability by providing capillary action that causes the braze to coalesce at the points of contact of the fingers 19 between the bonding surface 37 of the wall 35' of the cold heat sink 13 and the bonding surface 39 of the electrical insulator 33 connected to the electrically conducting strap 35 for the thermoelements 23 and 31, having a like strap 33'.

Figure 3:
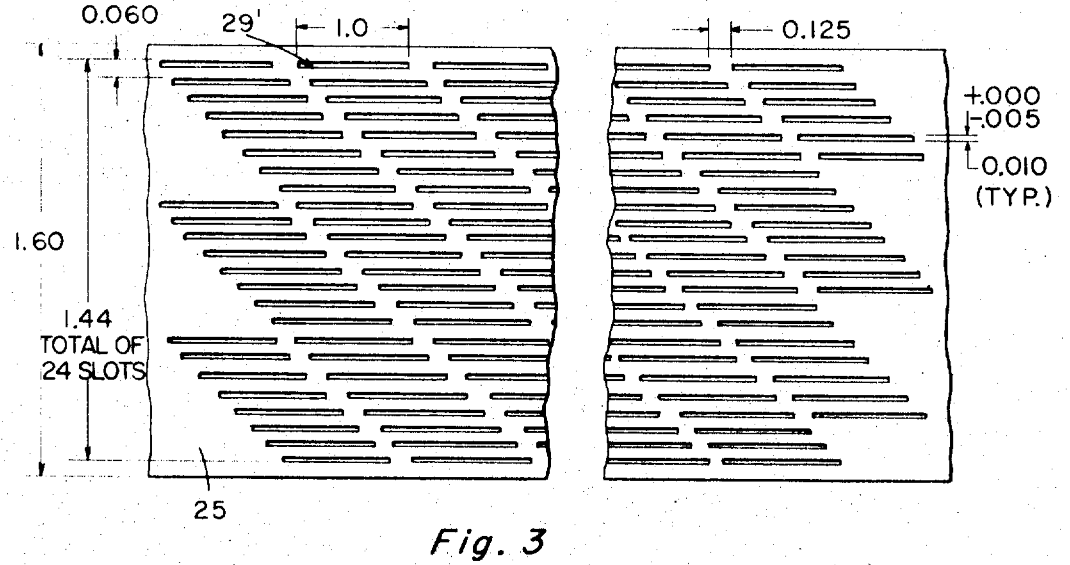
FIGURE 3 is a partial top-view of pre-punched foil from making the flexible waffle configuration of FIGURE 2.

A practical embodiment for a punched foil 25 for the connector 17 of this invention is illustrated in FIGURE 3. Shown there is a flat foil 25 that is uniformly 0.0035 inch thick for forming uniform waffles 0.25 inch high containing about 50 laminates per inch. To this end, the slots have parallel and equal lengths of 1.0 inch, equal 0.125 inch distances of separation between adjacent end-to-end slots, in a line along the axes of the slots equal 0.060 inch distances of separation between the adjacent rows of slots, equal slot widths of .010+.000−.005 inches, and a parallel, oblique offset arrangement of slots whereby a line that longitudinally corresponds and extends lengthwise through the axes of the slots 29 arranged in end-to-end relation on the side of foil 25 intersects obliquely in a plane with lines drawn through the adjacent centers of the adjacent slots transverse to the axes thereof.

In operation in nuclear space applications where thermoelectric power supplies may require location within a radiation shield, the folded waffle of this invention provides compactness and low weight, as much as 50% more compact and lower in weight than the stacked laminates and spacers known heretofore. In one example, the terminating surfaces of the foils of this invention have a thickness that is normally only 3–5 mils, which saves about 10% or more in weight over the systems known heretofore. Moreover, because of its high compactness, the folded foil design of this invention approaches optimum temperature loss vs. flexibility characteristics.

Figure 4:
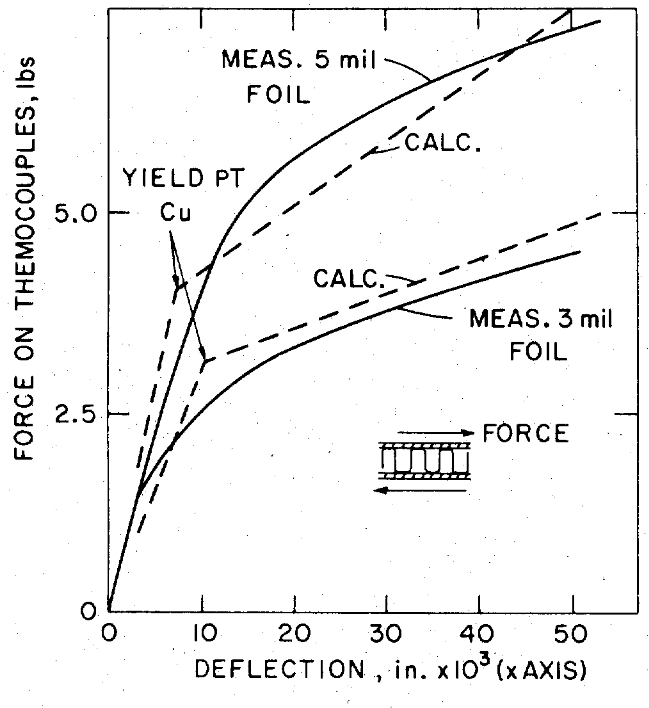
FIGURE 4 is a graphic plot of force in pounds on the ordinate vs. deflection in inches$\times 10^3$ on the abscissa in preslotted and folded, multiple laminate, flexible, copper connectors, like those of FIG. 2, along the $x$-axis shown therein, wherein the angles correspond to the yield point of the copper, the top solid and dashed lines represent measurements and calculations respectively on 5 mil foil and the bottom solid and dashed lines respectively represent the same for 3 mil foil.
Figure 6:
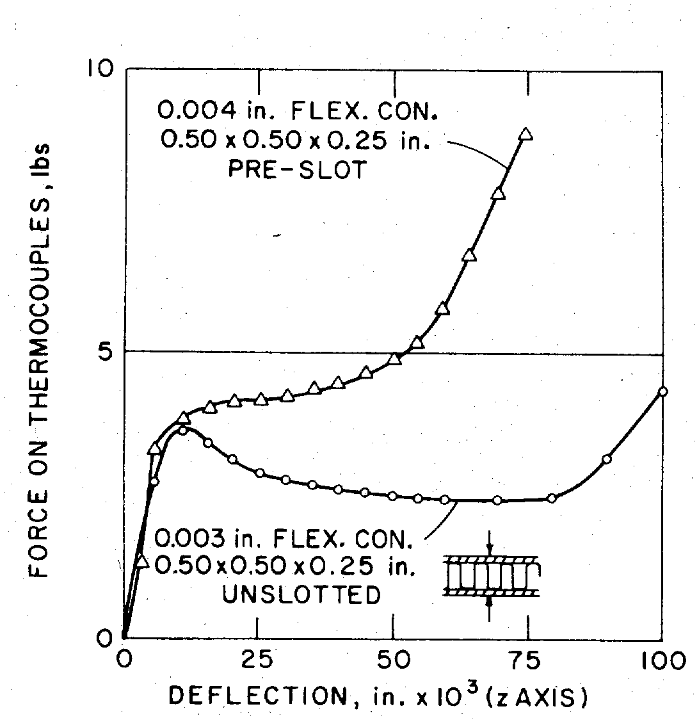
FIGURE 6 is a graphic plot of connectors corresponding to those of FIGURE 5 with the deflection being plotted along the $z$-axis shown in FIG. 2.
Figure 5:
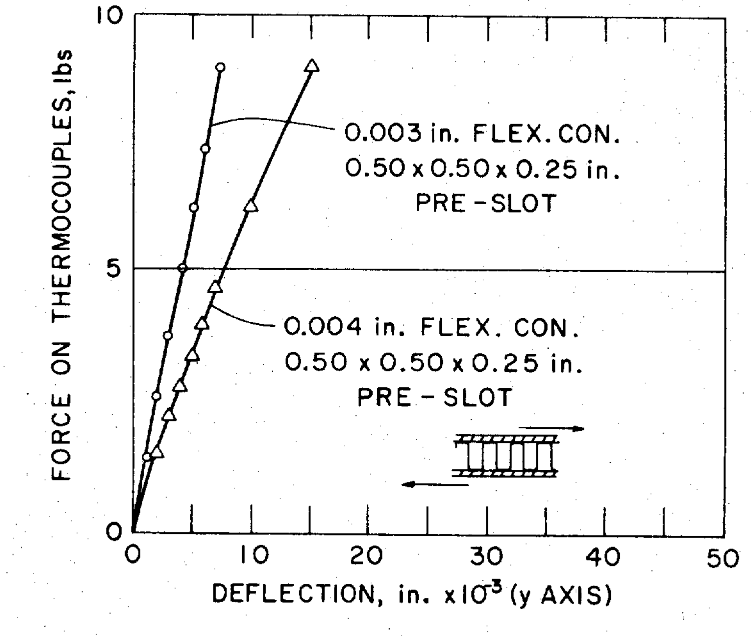
FIGURE 5 is a graphic plot of connectors corresponding to those of FIGURE 4 with the deflection being plotted along the $y$-axis shown in FIG. 2 and with the rectangular points representing measured points for a 0.004 inch thick flexible connector having width, thickness and height dimensions of 0.50 x 0.50 x 0.25 inch and the circular points being for a 0.003 inch thick connector having the same laminate dimensions.

A further distinct advantage of the multiple laminate flexible connectors of this invention employed for stress relief as described, is that the force vs. deflection compliance characteristics in the three mutually perpendicular $x$, $y$ and $z$ axes can be measured experimentally. Such measurements permit the forces transmitted to the thermoelements during temperature excursions of the module to be evaluated with accuracy. For example, in reference sub-module dimensions for an array of three by twelve thermocouples, the samples were brazed between two nickel plates with commercial brazing material. By attaching the plates to the jaws of a suitable tensile tester the sample was then deflected at a rate of 0.020 inch/min. while the force vs. deflection data were continuously recorded on a strip chart recorder during testing. Foil material from 0.003 inch to 0.005 inch thickness for eighteen samples were tested. Typical curves of force vs. deflection for both 0.003 inch and 0.004 inch material is shown in FIGS. 4–6.

It has been found that deflection in the $x$-axis direction of major compliance (i.e. perpendicular to the folded laminates), for a 0.50 x 0.50 inch reference connector, occurs by cantilever-type elastic deflection of the laminates followed after a small deflection by yielding. Comparison of measured deflections with deflections calculated for a double restrained cantilever model result in good agreement, and it is, therefore, believed that factors causing deflection perpendicular to the folded laminate are well understood. Particularly significant is the discovery that flexibility depends on the cube of the laminate length; consequently, if additional flexibility beyond that of the 0.25 inch long laminates of the reference is required, this can be achieved by slight length increases.

The measured and calculated temperature drops across copper multiple laminate flexible conductors of this invention are comparable. For the computations of a folded copper connector having a thermal conductivity of 3.7 watt/cm.− ° C. at an appropriate cold junction temperature of 300° C., an effective length of 0.250 inch (0.636 cm.), and a 15 percent laminate packing factor are assumed.

It will be understood from the above that the connector 17 of this invention provides shear stress relief associated with differential thermal expansion displacements between hot and cold heat exchanger plates and bimetallic stress compensation in the hot and cold junction insulator stacks between thermoelements and a heat sink therefor. These stresses, for example, were relieved during the metallurgical transition from Hastelloy X—to beryllia ceramic—to SiGe thermoelements wherein the thermal expansion coefficients for these materials was $15.5\times10^{-6}$, $9\times10^{-6}$ and $5\times10^{-6}$ ° C.$^{-1}$ respectively. Bimetallic curvature and high stresses in the thermoelements were avoided in actual test with a copper connector 17 operated up to 500° C., at which temperature copper remains stable and ductile with high thermal conductivity even in a vacuum. It was also noted that copper remains ductile even up to 1500° F. The tensile strength of the cold insulator stack used had an average strength of 460 lbs. force, which is well in excess of the normal strength requirements in a radioisotope heated thermoelectric generator.

In one sequence for forming the connector 17 of this invention, a flat copper foil is punched between appropriate dies having first and second parallel surfaces that are perforated with foraminae having uniform rectangular cross-sections corresponding to the desired slot dimensions by forcing cutters having rectangular cross-sections through the foraminae. The foraminae pattern corresponds to a slot pattern with rows of end-to-end slots seriatium in parallel lines that have their slots off-set from each other to form parallel oblique columns at the same angle to the lines.

Figure 2:
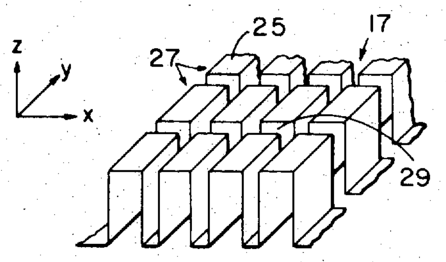
FIGURE 2 is a partial three-dimension view of a flexible waffle shaped connector for the generator system of FIGURE 1.

The foil is then folded between the slots, row by row, to form parallel rows of raised rectangular shaped waffles having parallel up-right sides between parallel tops and bottoms at right angles to the sides as shown in FIG. 2. The waffles are then compressed between parallel, planar surfaces between which the connector is to be attached. This causes the waffle sides to bend at their midpoint to form parallel rows of chevrons that in cross-section provide the periodic, continuous, and serpenting foil configuration shown in FIG. 1. Here again, the parallel tops and bottoms of the waffles are maintained while the bent waffle sides provide a spring force that holds the tops and bottoms against the members to which the connector 17 is to be connected, e.g. between surface 37 of wall 35' of the heat sink 13 and surface 39 of insulator 33. This connection, advantageously by brazing, proceeds with conventional brazing materials that are heated by conventional means, such as a suitable brazing furnace, while the connector and parallel compression pieces are held in a suitable brazing jig. It has thus been found that the connector can be brazed blind to a plurality of thermoelements attached to the insulator 33 in a reliable, efficient, shock-resistant, and trouble-free manner.

The flexible connector of this invention has the advantages of shock resistance, structural stability, small volume, efficiency, durability, reliability, and high heat transfer while providing high shear stress relief and three-dimensional compliance between hot and cold members. This connector is moreover, particularly adapted to provide flexibility and high heat transfer between hot and cold members in a radioisotope heated thermoelectric generator wherein high temperatures, high-temperature differentials and space environments are required. Additionally, actual tests have shown that the connector of this invention provides ease of manufacture in a method comprising compressing the connector into a .200" thick chevron shaped configuration with 26 leaves or laminations whereby the connector can be brazed between a plurality of thermoelements and the same or dissimiliar materials to limit the forces on the thermoelements to a few pounds or less.

What is claimed is:

1. A thermoelectric assembly comprising a plurality of thermoelements, a heat sink and a prepunched metal foil connecting said thermoelements to said heat sink, said foil being folded to form a raised waffle pattern at right angles to said thermoelements.

References Cited

UNITED STATES PATENTS

| | | | |
|---|---|---|---|
| 2,909,586 | 10/1959 | Hagspihl | 136—28 |
| 3,160,527 | 12/1964 | Hess | 136—86 |
| 3,183,121 | 5/1965 | Moeller | 136—210 |
| 3,325,312 | 6/1967 | Sonntag | 136—212 |
| 3,375,141 | 3/1968 | Julius | 136—89 |

WINSTON A. DOUGLAS, *Primary Examiner.*

A. BEKELMAN, *Assistant Examiner.*

U.S. Cl. X.R.

136—201, 205, 221, 230